US010730714B2

(12) United States Patent
Meyerhans et al.

(10) Patent No.: US 10,730,714 B2
(45) Date of Patent: Aug. 4, 2020

(54) METHOD AND APPARATUS FOR PRODUCING PERSONALIZED PRINTED PRODUCTS

(71) Applicant: MUELLER MARTINI HOLDING AG, Hergiswil (CH)

(72) Inventors: Rolf Meyerhans, Reiden (CH); Roland Kost, Oftringen (CH); Hans Leuenberger, Bottenwil (CH)

(73) Assignee: MUELLER MARTINI HOLDING AG, Hergiswil (CH)

( * ) Notice: Subject to any disclaimer, the term of this patent is extended or adjusted under 35 U.S.C. 154(b) by 200 days.

(21) Appl. No.: 15/669,947

(22) Filed: Aug. 6, 2017

(65) Prior Publication Data

US 2018/0057301 A1     Mar. 1, 2018

(30) Foreign Application Priority Data

Sep. 1, 2016    (CH) ........................................ 1134/16

(51) Int. Cl.
*B65H 39/14*       (2006.01)
*G06K 15/02*      (2006.01)
(Continued)

(52) U.S. Cl.
CPC ............... *B65H 39/14* (2013.01); *B42C 1/12* (2013.01); *B65H 16/005* (2013.01); *B65H 37/02* (2013.01);
(Continued)

(58) Field of Classification Search
CPC ............... G06K 15/404; G06K 15/024; B65H 2301/4311; B65H 2301/4312; B65H 39/075; B65H 39/115
See application file for complete search history.

(56) References Cited

U.S. PATENT DOCUMENTS 5,143,362 A * 9/1992 Doane ................... B65H 39/02
                                                         270/1.03
6,827,012 B1 * 12/2004 Palmatier ............. B65H 39/075
                                                          101/225
(Continued)

FOREIGN PATENT DOCUMENTS

DE         195 12 501 A1     10/1996
DE     10 2015 213 328 A1     1/2016

OTHER PUBLICATIONS

International Search Report for 01134/16, dated Dec. 2, 2016, and English translation thereof.

*Primary Examiner* — Jennifer E Simmons
(74) *Attorney, Agent, or Firm* — FisherBroyles, LLP; Robert Kinberg (57) ABSTRACT

Personalized printed products are produced in which at least one individually printed sheet is combined with conventionally printed sheets. A plurality of stacks of conventionally printed sheets are made available. In addition, a print material web is made available that contains individual sheet segments and respectively one marking based on information received from a database, or a roll is provided which contains a pre-printed material web containing the sheets segments with respective markings. The markings on the individual sheet segments are read out and information read from the markings is used for selective gathering of conventionally printed sheets that are needed for the personalize printed product. Following the readout of the markings, individually printed sheets are cut from the print material web. Respectively at least one individually printed sheet is supplied to the associated, conventionally printed sheets, corresponding to the information read from the marking from the one individually printed sheet.

22 Claims, 6 Drawing Sheets

(51) Int. Cl.
*G06K 15/00* (2006.01)
*B42C 1/12* (2006.01)
*B65H 16/00* (2006.01)
*B65H 37/02* (2006.01)
*B65H 37/04* (2006.01)

(52) U.S. Cl.
CPC ........... *B65H 37/04* (2013.01); *G06K 15/024* (2013.01); *G06K 15/404* (2013.01); *B65H 2701/1916* (2013.01); *B65H 2801/24* (2013.01)

(56) References Cited

U.S. PATENT DOCUMENTS

2003/0183097 A1* 10/2003 Pav ........................... B42C 1/10
    101/35
2004/0173958 A1* 9/2004 Graushar ................ B42C 19/04
    270/52.02

\* cited by examiner

Fig. 6

METHOD AND APPARATUS FOR PRODUCING PERSONALIZED PRINTED PRODUCTS

CROSS-REFERENCE TO RELATED APPLICATION

Priority is claimed to Swiss Application No. CH 01134/16, filed Sep. 1, 2016, the disclosure of which is incorporated herein by reference in its entirety.

BACKGROUND OF THE INVENTION

The invention relates to a method for producing personalized printed products, for which respectively at least one individually printed sheet is combined with a number of conventionally printed sheets to form a joint printed product. Information for producing the printed products is transmitted for this by a database to a control unit. The invention furthermore relates to a corresponding apparatus comprising a database with therein stored information for producing the printed products, a gathering device for the printed sheets, a feeding device for transporting the at least one individually printed sheet to the gathering device, several separating out and feeding devices for separating out conventionally printed sheets from stacks and feeding the several separated out, conventionally printed sheets to the gathering device, a binding device for the printed products composed of the gathered printed sheets, as well as a control unit. A binding device of this type can be embodied, for example, as a stitching device or an adhesive binder.

German patent document DE19512501 A1 discloses a method of this type and a corresponding apparatus with a printing press for printing onto printed sheets, as well as with a saddle stitcher for gathering and binding the printed sheets to form a printed product, wherein the apparatus comprises a database connected to a control unit. Based on the information received from the database, the printing press with the aid of an additional printing unit is capable of printing additional personalized data as well as an identification marking, in particular a barcode, onto printed sheets with a print image that is unchangeable per se, thereby creating printed sheets which are at least in part individually printed.

In addition, conventional printed sheets that only contain a print image that itself is unchangeable are deposited in a manner known per se in the form of stacks in various feeders of the apparatus. In contrast, the at least partially individually printed sheets, which contain in addition to the unchangeable print image also personalized data and an identifying marking, are deposited in the form of several stacks in an intermediate store. A reading and recording device is arranged in that region for reading out and storing the identifying marking and thus the sequence of the printed sheets deposited in the intermediate store. The identifying marking on the sheets transported from the intermediate store to the saddle stitcher is again read out by another reading and evaluating device, arranged along the transport route. The sequence of the printed sheets supplied to the saddle stitcher can be compared to the corresponding sequence stored in the reading and recording device for the printed sheets deposited in the intermediate store. The evaluation ensures that the conventionally printed sheets located in the feeders are only gathered and combined with the at least partially individually printed sheet belonging to the same personalized printed product. For the selective gathering of the conventionally printed sheets, the control unit uses corresponding information received from the database. By combining printed sheets already at least partially individually printed by a printing press with other, not individually printed sheets, or with sheets that are individually printed further in the saddle stitcher, this method and the corresponding apparatus can be used to produce large editions of personalized printed products and can be provided with the corresponding mailing addresses on the basis of the information available in the database. The separate sheets of each of these personalized printed products are stitched together with wire staples in the stitching machine of the saddle stitcher. Following this, the printed products are trimmed on three sides in a trimming station and are finally combined into packets ready for the shipping in a downstream arranged stacking station and/or cross-stacker.

However, a constant data link must be ensured between the control unit and the database for producing personalized printed products in this way. Data links of this type require a company-internal or even a cross-company data network which does not exist or not in a suitable manner for many companies offering such services or not in numerous parts of the world. Networks of this type are furthermore subject to interference, so that a sufficient operational safety cannot be ensured constantly. Finally, to ensure that printed sheets belonging to the same printed product are gathered requires a relatively involved method and a corresponding apparatus with additional devices for printing on the identifying marking, as well as the corresponding reading devices in the printing press and in the saddle stitcher.

German patent document DE102015213328 A1 discloses a method for producing smaller piece numbers of successively following, different printed products. With this method, a wound up and hitherto not printed on material web is first unwound and individually printed on with the aid of a digital printing unit, wherein an identifying marking is applied on each sheet segment of the material web. Immediately following that or following the intermediate storage and renewed unwinding of the printed-on material web provided with the identifying marking, the identifying marking is read out in a reading device and is used for activating a cross cutter for cutting off the individual sheet segments from the print material web, as well for activating downstream-arranged devices, e.g. a stitching and folding unit for the further processing of the sheet segments.

With a method and device of this type, however, only printed sheets from the same print material web can be processed into personalized printed products. A combining of printed sheets not stemming from this print material web and supplied in a different manner is not planned.

SUMMARY OF THE INVENTION

It is therefore an object of the invention to create a network-independent method with improved operational safety and a corresponding apparatus for producing error-free, personalized printed products, composed of at least one individually printed sheet and a number of conventionally printed sheets. In addition, the method and the apparatus should be simple and cost-effective.

The above and other objects are achieved according to one aspect of the invention by the provision of a method for producing personalized printed products for which at least one individually printed sheet is gathered together with a number of conventionally printed sheets to form the personalized printed products, wherein information for producing the personalized printed products is contained in a database, the method comprising steps of: making available stacks of conventionally printed sheets; printing a material web to form a print material web including printed individual sheet segments, with each printed individual sheet segment having printed thereon a marking based on information received from the database for controlling production of the personalized printed products, or making available a roll which holds a pre-printed print material web already imprinted according to the printing step; reading out the markings on the individual sheet segments and using the read-out information for selectively gathering, from the stacks, conventionally printed sheets that belong to respective personalized printed products to be formed; following the reading out of the markings on the individual sheet segments, cutting the print web material to form individually printed sheets corresponding to the individual sheet segments, respectively; and gathering the printed sheets by supplying at least one of the individually printed sheets to selectively gathered, conventionally printed sheets in accordance with information read out from the marking on the at least one individually printed sheet to form one of the personalized printed products.

According to another aspect of the invention there is provided an apparatus for producing personalized printed products which respectively comprise at least one individually printed sheet and a number of conventionally printed sheets, the apparatus comprising: a memory to store a database containing information for producing respective personalized printed products; one of 1) a web press for printing individual sheet segments onto a print material web along with a marking based on information received from the database for controlling production of the personalized printed products, and 2) an unwinding device for a pre-printed print material web containing individual printed sheet segments along with a marking for controlling production of the personalized printed products; a reading device arranged for reading the markings; a cutting device arranged for cutting off individually printed sheets from the print material web with thereon printed individually printed segments; a gathering device for the printed sheets; a feeding device for transporting the individually printed sheets to the gathering device; a plurality of separating out and feeding devices for separating out a plurality of conventionally printed sheets from a plurality of stacks of conventionally printed sheets according to information read out from the marking on one of the individually printed sheets and for supplying the plurality of the separated out, conventionally printed sheets to the gathering device, wherein the gathering device gathers at least one of the individually printed sheets together with the plurality of separated out, conventionally printed sheets associated with the marking read from the at least one individually printed sheet; a binding device for binding the at least one individually printed sheet and the plurality of separated out, conventionally printed sheets gathered by the gathering device to form one of the personalized printed products; and a control device to which at least the reading device, feeding device for the at least one individually printed sheet and the separating out and feeding devices for the conventionally printed sheets are connected.

With the method according to the invention, several stacks of conventionally printed sheets are initially made available. Also made available is a print material web with several individual sheet segments, on which respectively one marking is printed that contains information received from the database for controlling the production of personalized printed products, or a roll of such a print material web is made available. The markings on the individually printed sheet segments are read out and the information obtained in this way is then used for selectively gathering conventionally printed sheets that belong to a single printed product and are made available in stacks. Following the readout of the markings on the individual sheet segments, individually printed sheets with respectively one individual sheet segment are cut from the print material web. Finally, at least one individually printed sheet is added to the associated, selectively gathered conventionally printed sheets, corresponding to the information read out of the marking.

For this, the inventive apparatus is provided with a web press for printing onto a print material web with individual sheet segments and for affixing a marking, based on information received from the database for controlling the production of personalized printed products, or an unwinding device for such a print material web. The apparatus furthermore comprises a device for the readout of markings as well as a cutting device for cutting off individually printed sheets from the print material web with thereon printed individual sheet segments, wherein at least the reading device, the feeding device for the at least one individually printed sheet, and the separating out and feeding devices for the conventionally printed sheets are connected to the control unit.

The control of the selective feeding of the conventionally printed sheets thus takes place based on the sequence contained in the markings affixed to the print material web. With this method and the corresponding apparatus, a constant connection between the control unit and the database can thus be omitted, so that a corresponding network is advantageously not needed. Accordingly, a very simple operational control is achieved which is also suitable for companies or countries having little infrastructure. Any printable and machine-readable character can therefore be used for the marking, for example barcodes. Of course, other devices in the apparatus can also be controlled with the marking. For example, if the cutting device is also activated with the aid of the respective marking, no cutting marks need to be affixed.

With this method and the corresponding apparatus, the advantages of conventionally printed sheets, which are produced in large piece numbers and collected to form printed products, can furthermore be combined with the advantages of individually printed sheets which are highly effective for advertising.

According to one embodiment of the method according to the invention, the marking is read out immediately following the printing, or once the roll with the print material web is made available. For this, the reading device is arranged directly downstream of the web press or the unwinding device. The data can thus be transmitted early and used for the further processing of the at least one individually printed sheet and the therewith combined conventionally printed sheets that form a single printed product. Despite system-dependent differences in the transporting route for the selective feeding of conventionally printed sheets, there is always sufficient time for a corresponding activation of the respective separating out and feeding devices because of the early transmitting of data. A relatively short production time and/or a relatively large operational capacity can furthermore be achieved.

According to a different embodiment of the inventive method, supplying the at least one individually printed sheet to selectively gathered, conventionally printed sheets occurs either upstream or downstream of at least one of the conventionally printed sheets. For this, the device for feeding the at least one individually printed sheet is arranged upstream or downstream of at least one of the separating out and feeding devices for conventionally printed sheets, so as to discharge into the gathering device. In this way, the at least one individually printed sheet can advantageously be supplied in any position for producing optional combinations of personalized printed products.

According to another embodiment of the inventive method, an individually printed sheet is transported in a clocked operation from a first position where its marking is read out to a second position in which this individually printed sheet is supplied to the selectively gathered, conventionally printed sheets. The conventionally printed sheets are furthermore also supplied in a clocked operation, starting from a third position at a first, upstream-arranged separating out and feeding device for conventionally printed sheets, to the second position in which the individually printed sheet is supplied to the selectively gathered, conventionally printed sheets. In the process, a first number of operating cycles for the transport of the individually printed sheet is higher than a second number of operating cycles for the transport of the selectively gathered, conventionally printed sheets.

A clocked first transport section is arranged for this between the device for reading the markings on the print material web and the feeding device for the at least one individually printed sheet, and a clocked second transport section is embodied between a first upstream separating out and feeding device for conventionally printed sheets and the feeding device for the at least one individually printed sheet. The number of first operating cycles of the first transport section in this case is here larger than the number of second operating cycles of the second transport section.

Using this method and the corresponding apparatus allows for sufficient time for each activated configuration of the separating out and feeding device for conventionally printed sheets, following the readout of the respective marking on an individually printed sheet, to selectively separate out the conventionally printed sheets belonging to the same printed product.

An extension can also be installed between the reading device and the cutting device, for example taking the form of an additional web guide. If necessary, different machine cycles between the first and the second transport section can thus be compensated in a cost-effective manner.

According to a different embodiment of the inventive method, several successively following, individually printed sheets are initially collected and jointly supplied to the selectively gathered, conventionally printed sheets. A device for collecting several individually printed sheets is arranged for this upstream of the feeding device. In this way, it is possible to jointly supply not only individually printed items, e.g. an envelope or a single insert, but a plurality of individually printed items such as catalogue supplements. The advertising value of the produced printed product, which is tailored to a specific person or a group of persons, can consequently be noticeably increased.

According to yet another embodiment of the inventive method, the printed sheets belonging to a single printed product are opened for the gathering operation, are deposited in the opened state successively and one above the other, are jointly transported in the process and are then stitched together. The gathering device is embodied for this as part of a saddle stitcher and is provided with a gathering chain having a saddle-shaped ridge onto which the printed sheets, previously opened for the transport, are deposited successively and one on top of the other. The binding device is furthermore embodied as a stitching device for the saddle stitcher that is arranged downstream of the gathering device.

The use of a saddle stitcher involves a technology which has long proven itself for the production of printed products, composed of conventionally printed sheets, which allows achieving high capacities, and which can also advantageously be used for the comprehensive personalization of printed products.

According to another embodiment of the inventive method, the print material web is grooved in the longitudinal direction prior to cutting off individually printed sheets. Alternatively, the individually printed sheets are grooved or creased once they are cut from the print material web. A grooving device for the print material web and/or the individually printed sheets once they are cut from the print material web is provided for this either upstream or downstream of the cutting device. In addition, the individually printed sheets are folded in the longitudinal direction in a folding device prior to being deposited on the gathering chain. The feeding device for the at least one individually printed sheet is provided for this with a folding device. Starting with the print material web, the individually printed sheets can thus be folded advantageously online, without interruption of the production method, and can subsequently be processed further in the saddle stitcher to form printed products.

For one alternative embodiment of the method according to the invention, the printed sheets belonging to a printed product are deposited successively and one above the other for the gathering, are transported jointly in the process, and are then glued together. The gathering device is provided for this with a conveying device, with the printed sheets deposited successively thereon, one on top of the other, and transported while positioned flat. The binding device is embodied as an adhesive binder arranged downstream of the gathering device. The adhesive binding method, which has long been known, can thus also be used advantageously for a comprehensive personalization of printed products.

According to a further embodiment of the method according to the invention, the information gained when reading out the markings for the individual sheet segments may additionally be used for addressing and/or stacking the personalized printed products. The apparatus according to the invention is provided for this with an addressing device for printing the mailing address onto the personalized printed products, as well as a stack-forming station for preparing the personalized printed products for the shipping. The addressing device and/or the stack forming station is additionally connected to the control unit of the apparatus. As a result, additional information contained in the markings can advantageously be used for shipping the respective personalized printed products, wherein a constant connection between the control unit and the database is also not needed for this.

According to a different embodiment of the inventive method, a direct data exchange occurs between the database and the control unit for which a data line is arranged in the apparatus between the database and the control unit. With such a permanent data line, which is optional and is provided in addition to the control of the selective feeding of the conventional printed sheets with the aid of the markings applied to the print material web, and via the data exchange made possible in this way, intermediate changes to the client data can be entered on short notice, provided a company-internal or a cross-company network exists, and the operational sequence can be adapted accordingly. In addition, the data can be read out for a real-time reporting and made available to an evaluation software.

A different embodiment of the inventive method provides for the print material web to be printed on with the digital printing method, wherein the web press is embodied for this as digital printing press. With successively following, different printed products, the changes required for the print images to be applied to the print material web and the markings can be realized relatively easily and the advantages of the digital printing method used effectively.

BRIEF DESCRIPTION OF THE DRAWINGS

The invention is described in more detail in the following with the aid of an exemplary embodiment, in which.

DETAILED DESCRIPTION OF THE INVENTION

Figure 1:
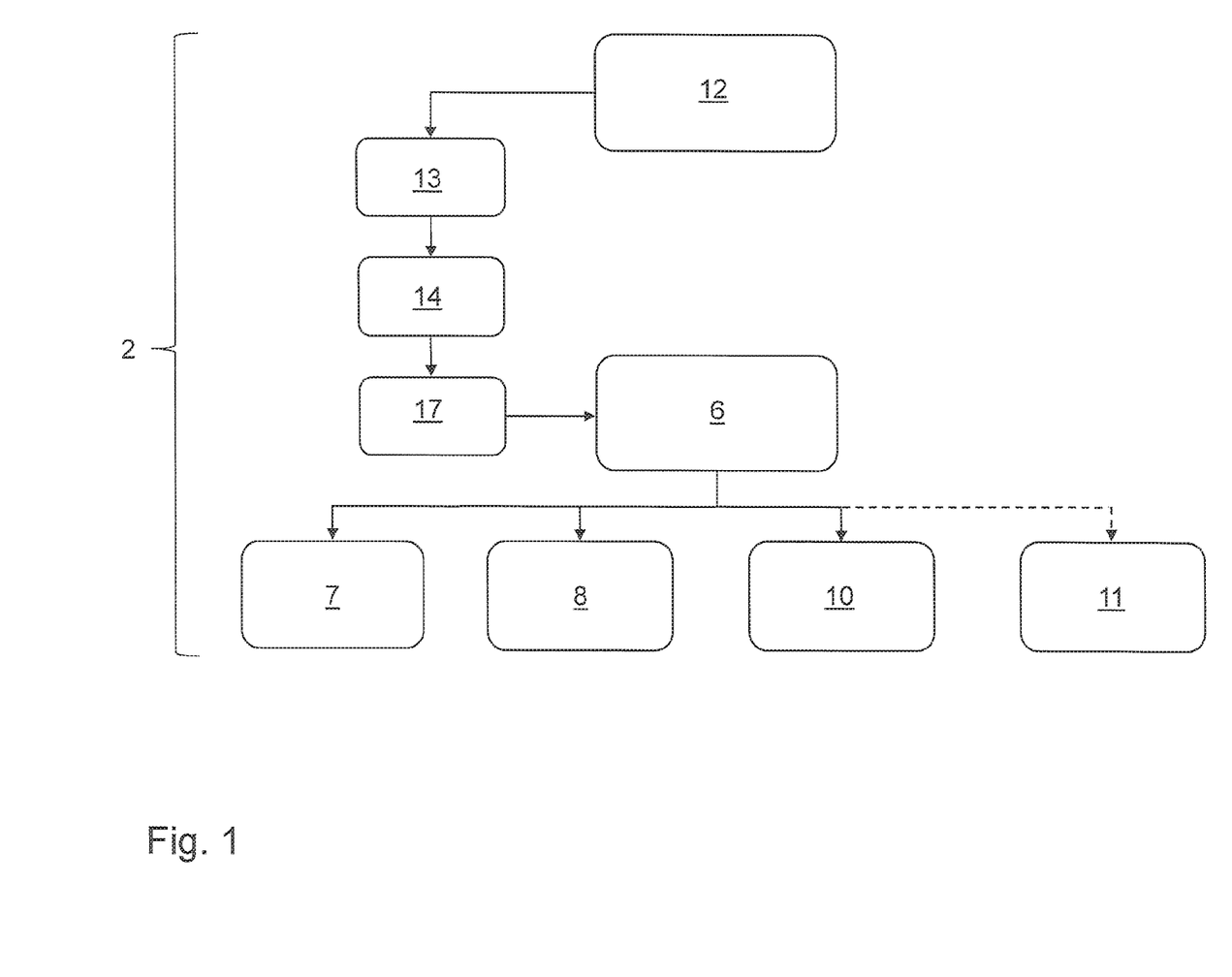
FIG. 1 is a schematic representation of the activation of an apparatus according to the invention, suitable for producing personalized data.
Figure 2:
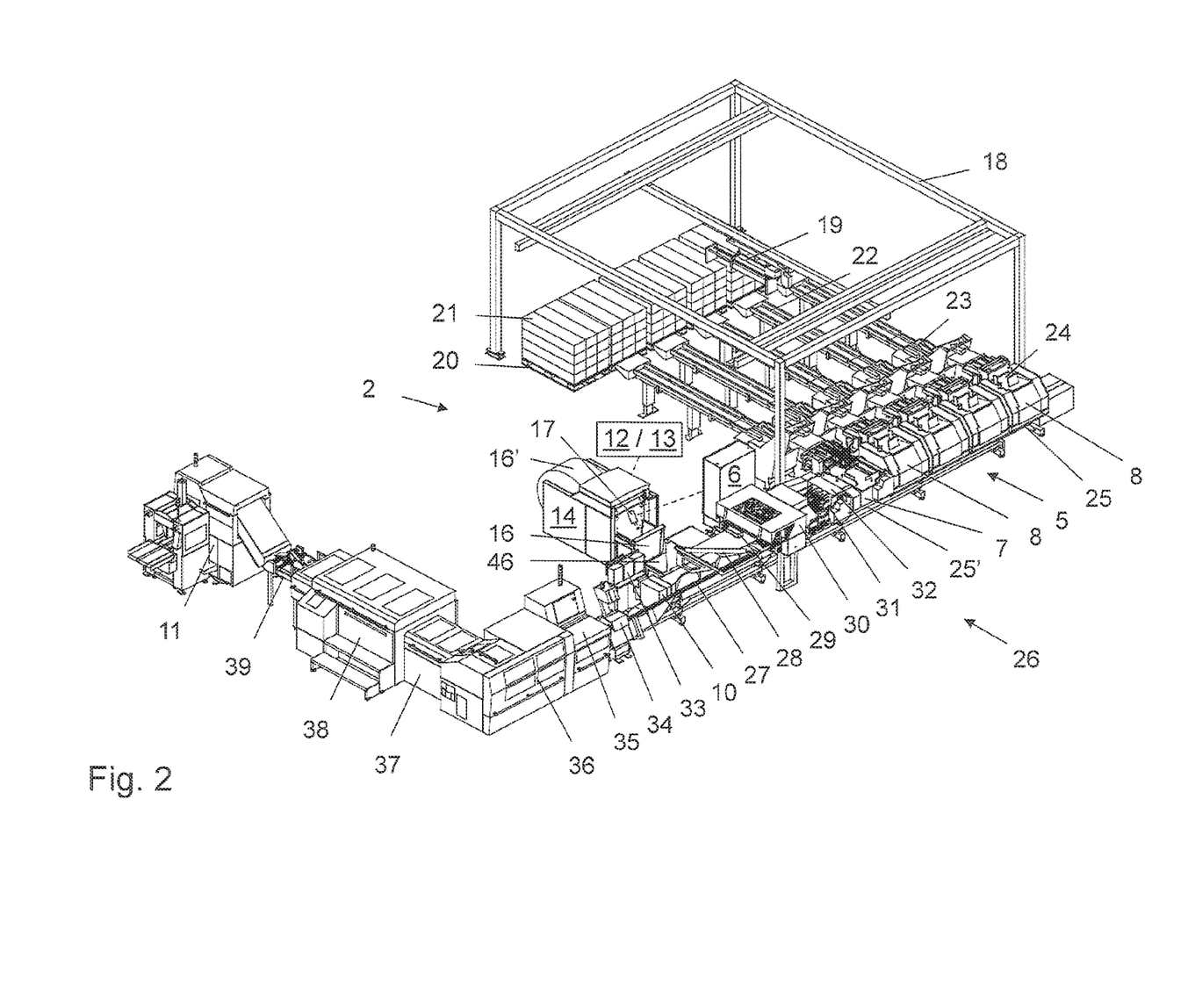
FIG. 2 is a perspective representation of the machine configuration of a first exemplary embodiment of the apparatus according to the invention, provided with a web press.
Figure 3:
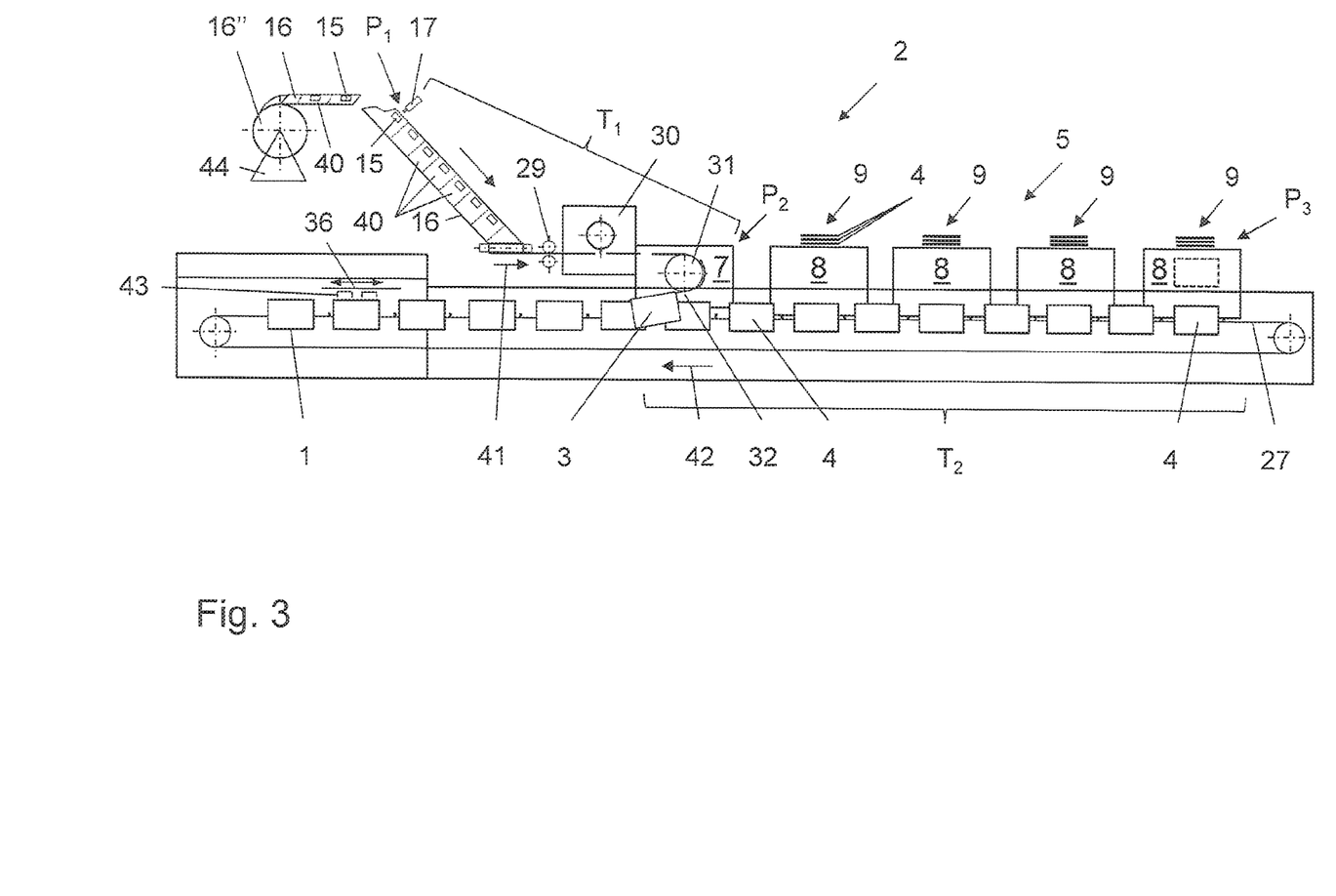
FIG. 3 is a schematic representation of the functional principle, based on FIG. 2, but provided with an unwinding device for an already printed-on roll.
Figure 4:
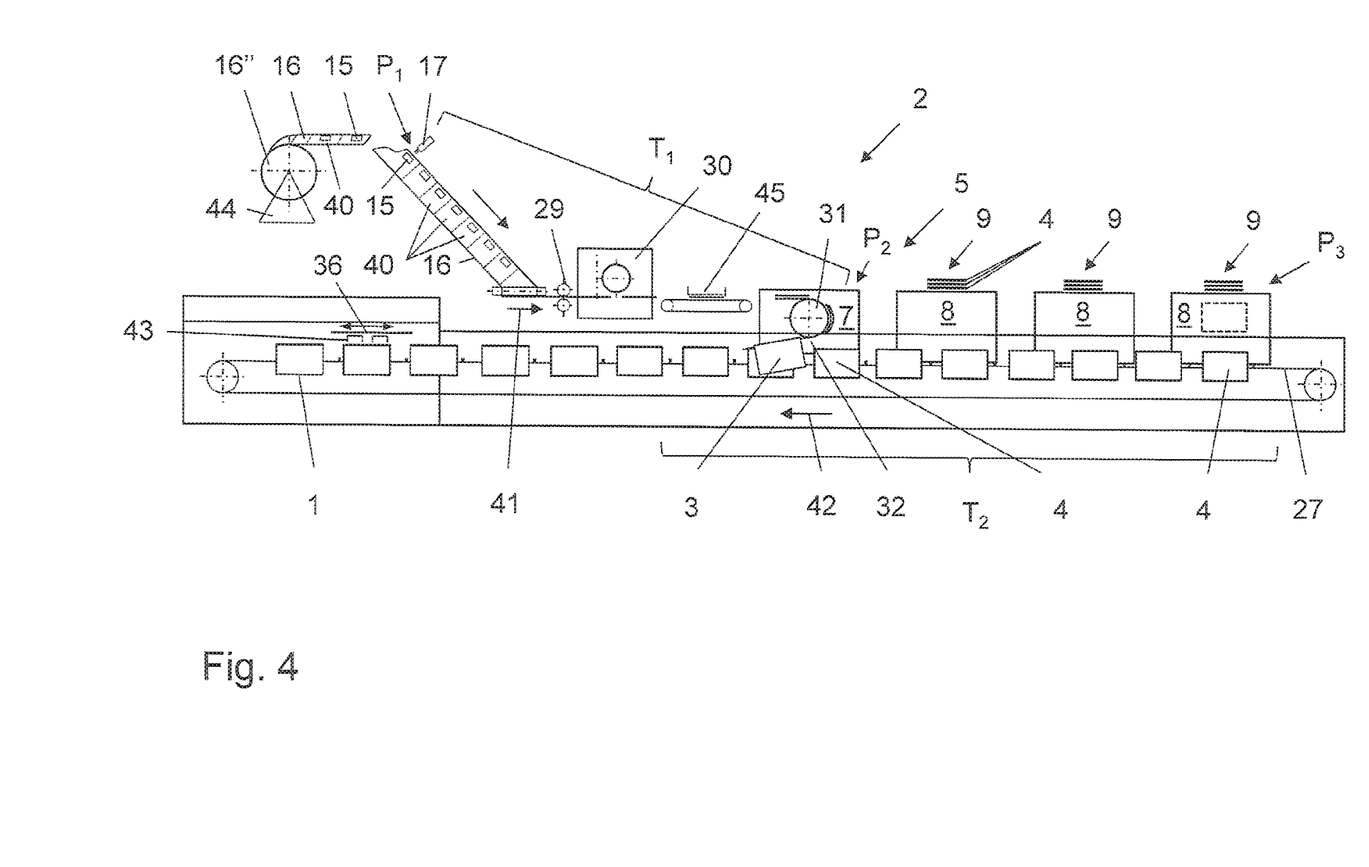
FIG. 4 is a schematic representation of the functional principle, showing a variant to FIG. 3.
Figure 5:
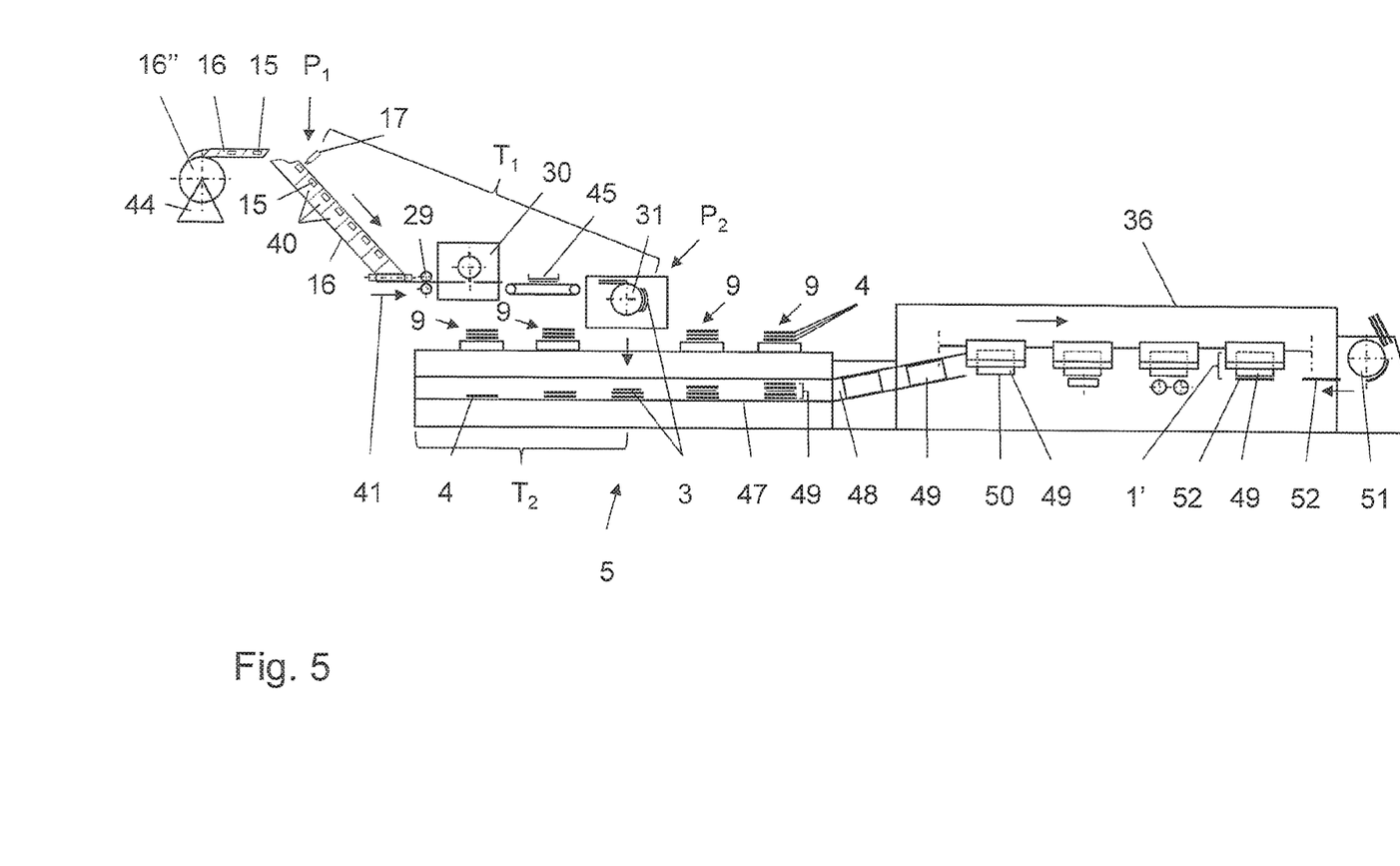
FIG. 5 is a schematic representation of the functional principle for a second exemplary embodiment of the inventive apparatus.

FIG. 1 shows a schematic representation of the activation of an apparatus 2, suitable for producing personalized printed products 1, 1' shown in FIGS. 3 to 5. The personalized printed products 1, 1' to be produced with the apparatus 2 respectively comprise at least one individually printed sheet 3, as well as a number of associated, conventionally printed sheets 4, that is to say sheets containing unchanged print images. These printed sheets 3, 4 are deposited in a gathering device 5 that is shown in FIG. 2 as part of a saddle stitcher 26, for example in a necessary sequence and one on top of the other for the personalized printed products 1 to be produced, and are subsequently joined. For this, the apparatus 2 is provided with a control unit 6 that is connected to various machine components for producing the personalized printed products 1, 1'. The machine components shown as examples in FIG. 1 are a feeding device 7 for the individually printed sheets 3, several separating out and feeding devices 8 embodied as folding feeders for separating conventionally printed sheets 4 out from stacks 9 (FIG. 3; FIG. 4) and for feeding these sheets 4 to the gathering and stitching device 5, as well as an addressing device 10 and a stack forming station 11, arranged downstream of the apparatus 2 and embodied as cross stacker.

The apparatus furthermore comprises a memory to store a database 12 which contains the client data necessary for producing and shipping the personalized printed products 1, 1'. Connected to the database 12 is a computer 13 which runs a software program for coding the information received from the database 12, corresponding to the respective production order. Based on this coding, a web press 14 that is connected to the computer 13 can affix jointly with the respective print image or also separately a machine-readable marking 15 (FIGS. 3 to 5), for example a barcode, onto a continuous print material web 16 that is made available to the web press 14. The web press 14 in this case is advantageously a digital printing press, which prints the diverse print images as well as the markings 15 onto the print material web 16. However, a separate printing unit can also be provided for printing on the markings 15. Of course, a traditional web press equipped with an additional printing unit can also be used for printing on the markings 15. A readout device 17 is arranged downstream of the web press 14 for reading out the markings 15.

FIG. 2 shows a first exemplary embodiment in an online solution for which the web press 14 for producing individually printed sheets 3 is connected to the corresponding machine components of the apparatus 2. The apparatus 2 is provided with a lifting device 19 for bar-shaped stacks 21, deposited on pallets 20, of conventionally printed sheets 4. The conventionally printed sheets 4 were produced previously on non-depicted printing presses and transported to the current location in the form of bars, with the printed sheets 4 positioned upright on one edge. For this, the printed sheets 4 of all stacks 21 positioned on a pallet 20 are provided with identical, unchangeable print images. By contrast, the unchangeable print images of printed sheets 4 which are stacked on different pallets 20 are different, meaning the printed sheets 4 on a single pallet 20 have identical print images that differ from the also identical print images of the printed sheets 4 stacked on another pallet 20. Alternatively, it is possible to manually supply loosely stacked packets or bundles of printed sheets 4, or the feeding of printed sheets 4 can be realized with different methods.

Downstream of each pallet 20, a bar-feeding device 22 is arranged which is followed by a conveying element 23 for the re-orienting of the printed sheets 4, previously supplied standing upright and directly adjoining, in order to form a non-depicted overlapping flow of printed sheets 4 and to supply this flow to a stacking magazine 24 of the respective separating out and feeding device 8. Shown herein are four separating out and feeding devices 8, which are respectively positioned in a specified extension 25 in the apparatus 2, above the gathering chain 27 of the saddle stitcher 26. Of course, the saddle stitcher 26 and thus the apparatus 2 can also have a clearly higher number of more than twenty extension locations 25, with thereon mounted separating out and feeding devices 8. The feeding device 7 for the individually printed sheets 3 is positioned on an additional extension 25' of the apparatus 2.

Even though the embodiment in FIG. 2 shows that the further extension location 25' of the feeding device 7 for the at least one individually printed sheet 3 is arranged downstream of the extension locations 25 for the separating out and feeding devices 8 for conventionally printed sheet 4, the additional extension location 25' of the feeding device 7 for the at least one individually printed sheet 3 can be arranged in principle upstream or downstream of each individual extension location 25 for the separating out and feeding devices 8, so as to empty at an optional location into the gathering device 5.

A turning rod 28 for changing the direction of the print material web 16 toward the direction of the feeding device 7 for individually printed sheets 3 is arranged downstream of the web press 14 and the reading device 17 for the applied markings 15. Further downstream of the turning rod 28, a grooving device 29 follows initially and then a cutting device 30 for the print material web 16. A deflection drum 31 and a folding device 32 for the individually printed sheets 3 are arranged between the cutting device 30 and the feeding device 7 for the individually printed sheets 3.

Further downstream along the gathering chain 27 of the saddle stitcher 26, the apparatus 2 is provided with the addressing device 10, for example embodied as an inkjet printer, as well as with a control and alignment unit 35 for the gathered printed sheets 3, 4, a thickness control device 34, an operating console 35 for a machine operator, and a binding device 36 embodied as stitching machine.

The saddle stitcher 26 is followed downstream by a first transporting device 37 for the transport to a three-way cutter 38 which is followed by a second transporting device 39 for the transport to the stack-forming station 11, embodied as a cross stacker.

During the operation of the apparatus 2, several bar-shaped stacks 21 of conventionally printed sheets 4 can be made available on pallets 20, in a manner known per se, and can be moved as needed via the lifting mechanism 19 to the respective bar feeding device 22. From there, the corresponding stacking magazines 24 of the separating out and feeding devices 8 are supplied via its conveying element 23 with conventionally printed sheets 4. These conventionally printed sheets 4 are provided in the separating out and feeding devices 8 in the form of stacks 9 (FIGS. 3 and 4). Of course, conventionally printed sheets 4 can also be supplied to the separating out and feeding devices 8 with the aid of different types of devices or by the operating personnel.

Simultaneous with the feeding of conventionally printed sheets 4 to the separating out and feeding devices 8, or also with a time delay, the print material web 16 that is wound into a not yet printed roll 16' is printed on with several individual sheet segments 40 (FIG. 3; FIG. 4) in in the web press 14, meaning with respectively changeable print images. Also printed onto each individual sheet section 40 of the print material web 16 is respectively one marking 15, based on information received from the database 12 for controlling the production of the personalized printed products 1. The markings 15 of the individual sheet segments 40 are read out early via the reading device 17, meaning immediately after the printing, and the information obtained from these is used for the selective gathering of conventionally printed sheets 4, available in the stacks 9, to form a single printed product 1. In other words, the separating out and feeding devices 8 are no longer activated directly via information from the database 12, as is the case with the prior art, but rather by means of the information read out of the respective marking 15. In a clocked operation and at the correct point in time, the activated separating out and feeding devices 8 subsequently separate out only those conventionally printed sheets 4, which are needed for the personalized printed product 1 to be produced, and deposit these on the gathering chain 27 of the saddle stitcher 26. For this, only the separating out and feeding devices are activated which according to the information read out of the marking 15 carry the conventionally printed sheets 4 needed for the personalized printed product 1 currently to be produced.

The printed-on material web 16 is meanwhile conveyed via different, not designated deflection rolls from the web press 14 in the direction of the downstream arranged cutting device 30. In the process, the print material web 16 is turned by 90° via the turning rod 28 (FIG. 2) and is grooved upstream of the cutting device 30 with the grooving mechanism 29 in the longitudinal direction 41 (FIG. 3). In the cutting device 30, the print material web 16 is cut transverse to its longitudinal direction 41, meaning the individual sheet segments 40 are separated from the print material web 16, thus creating the individual printed sheets 3. These individual printed sheets 3 are deflected in the deflection drum 31 in the direction of the gathering chain 27, are folded in the folding device 32 along the previously created groove and finally are deposited via the feeding device 7 in a clocked operation onto the associated conventionally printed sheets 4, previously deposited on the non-depicted ridge of the gathering chain 27. Of course, the grooving can also take place in the deflection drum 31. The individually printed sheets 3, however, can also be folded without prior grooving of the print material web 16.

The further transport of the printed sheets 3, 4 which later on form respectively one personalized printed product 1, but are still positioned loosely one above the other on the gathering chain 27, takes place in transporting direction 42 which essentially is counter to the longitudinal direction 41 of the supplied print material web 16. During this transport, one of the printed sheets 3, 4 can be provided as needed by the addressing device 10 (FIG. 2) with an address, based on the information obtained from the respective marking 15. The printed sheets 3, 4, deposited one above the other, subsequently pass through the control and alignment device 33 which is also known per se and, if necessary, are aligned relative to each other at its downstream end. In the following thickness control device 34, the thickness of the stacked printed sheets 3, 4 is detected, to determine whether the personalized printed product 1 to be finished later on actually contains all necessary printed sheets 3, 4. An incomplete printed product 1 can be removed in a manner known per se without further processing and, if applicable, assembled once more with the aid of the web press 14. However, if the checked printed sheets 3, 4 were gathered correctly and aligned, these are bound in the binding device 36 through wire-stitching with the aid of wire staples 43 (FIG. 3; FIG. 4) to form respectively one personalized printed product 1. In the following three-way trimmer 38, the personalized printed products 1 are then cut to format on three sides and prepared for the shipping in the stack building station 11, meaning they are stacked (FIG. 2). The machine operator can monitor and control the described operational sequences at the control console 35.

Since the feeding device 7 for the at least one individually printed sheet 3 can be arranged upstream or downstream of at least one of the separating out and feeding devices 8 for conventionally printed sheets 4, such that it discharges into the gathering device 5, the at least one individually printed sheet 3 can be combined at an optional position with the selectively gathered, conventionally printed sheets 4. A large spectrum is thus advantageously provided for the varied combination of different personalized printed products 1.

With the so-called online solution shown in FIG. 2, the personalized printed products 1 are produced immediately following the printing of the individual sheet segments 40 and the respective markings 15 thereon with the aid of the web press 14.

FIG. 3 shows an alternative solution with a so-called offline solution for which a roll 16" of a print material web 16 that was accordingly printed on previously, is made available and is installed into an unwinding device 44. The previously printed-on roll 16" can be stored intermediately for this, or can be conveyed from the printing plant to a separate company offering further processing services. In that case, the reading device 17 is arranged directly downstream of the unwinding device 44. During the unwinding of the print material web 16, the markings 15 on its individual sheet segments 40 can thus also be read out early. The following operational sequence up to the finishing of the personalized printed products 1 is essentially the same as previously described in connection with FIG. 2.

FIG. 4 shows a variant to FIG. 3 for which additionally a gathering device 45 for individually printed sheets 3 is arranged between the cutting device 30 and the deflection drum 31. Such a gathering device 45 could, of course, also be integrated into the deflection drum 31. With this, several individually printed sheets 3 can advantageously be gathered once they are cut from the print material web 16 and can then be deposited jointly onto the associated conventionally printed sheets 4, previously gathered on the gathering chain 27. This arrangement advantageously provides further options for the production of personalized printed products 1.

For the offline as well as the online solution, a clocked first transport section $T_1$ is arranged between the reading device 17 for the markings 15 on the print material web 16 and the feeding device 7 for the at least one individually printed sheet 3, and a second clocked transport section $T_2$ (FIG. 3; FIG. 4) is arranged between a first, upstream separating out and feeding device 8 for conventionally printed sheets 4 and the feeding device 7 for the at least one individually printed sheet 3. Accordingly, the at least one individually printed sheet 3 is transported with a clocked operation on the transport section $T_1$ from a first position $P_1$ where its marking 15 is read out to a second position $P_2$ in which this at least one individually printed sheet 3 is supplied to the selectively gathered, conventionally printed sheets 4. In addition, the conventionally printed sheets 4 are also transported in a clocked operation on the transport section $T_2$. This transport starts from a third position $P_3$, located upstream of a separating out and feeding device 8 for conventionally printed sheets 4, to a second position $P_2$ in which the at least one individually printed sheet 3 is supplied to the selectively gathered, conventionally printed sheets 4. In the process, a first number of operating cycles for the transport of the at least one individually printed sheet 3 on the first transport section $T_1$ is higher than a second number of operating cycles during the transport of the selectively gathered, conventionally printed sheets 4 on the second transport section $T_2$. As a result and following the readout of the respective marking 15 of the at least one individually printed sheet 3, there is always enough time for a selective separating out of the conventionally printed sheets 4 belonging to the same printed product 1, meaning it is easy to compensate for a change in the clocking of the second transport section $T_2$, resulting from the above-described activation of respectively different separating out and feeding devices 8 based on the larger number of operating cycles in the first transport section $T_1$.

Owing to the above-described arrangement of deflection rolls between the reading device 17 and the cutting device 30, an extension 46 can be installed in the first transport section $T_1$ (FIG. 2), thus making it possible to compensate for operation-dependent different machine cycles between the first transport section $T_1$ and the second transport section $T_2$.

FIG. 5 shows a second exemplary embodiment for which in contrast to the first exemplary embodiment the gathering device 5 is provided with a conveying device 47 on which conventionally printed sheets 4, separated out of the stacks 9, are deposited successively one on top of the other, along with the individually printed sheets 3 supplied by the deflection drum 31, and for the transport of the thereon deposited printed sheets 3, 4. Of course, another suitable feeding unit can also be used instead of a deflection drum 31. The binding device 36 is furthermore embodied as adhesive binder, arranged downstream of the gathering device 5 and connected with the latter via a feeder 48. In this adhesive binder, book blocks 49 are formed with the stacked printed sheets 3, 4. The book blocks 49, which are positioned upright in the feeder 48, are then processed along the spine 50 in several stations not designated further, in a manner known per se, and are finally joined with the aid of a cover 52, supplied by a cover feeder 51, to form personalized printed products 1'. The second exemplary embodiment differs little from the first exemplary embodiment, except for the fact that the printed products 1 formed with individually printed sheets 3, which are deposited flat on the previously gathered, conventionally printed sheets 4 that are also positioned flat, are not wire-stitched together with these sheets 3, 4, but are glued together to form a printed product 1'.

Figure 6:
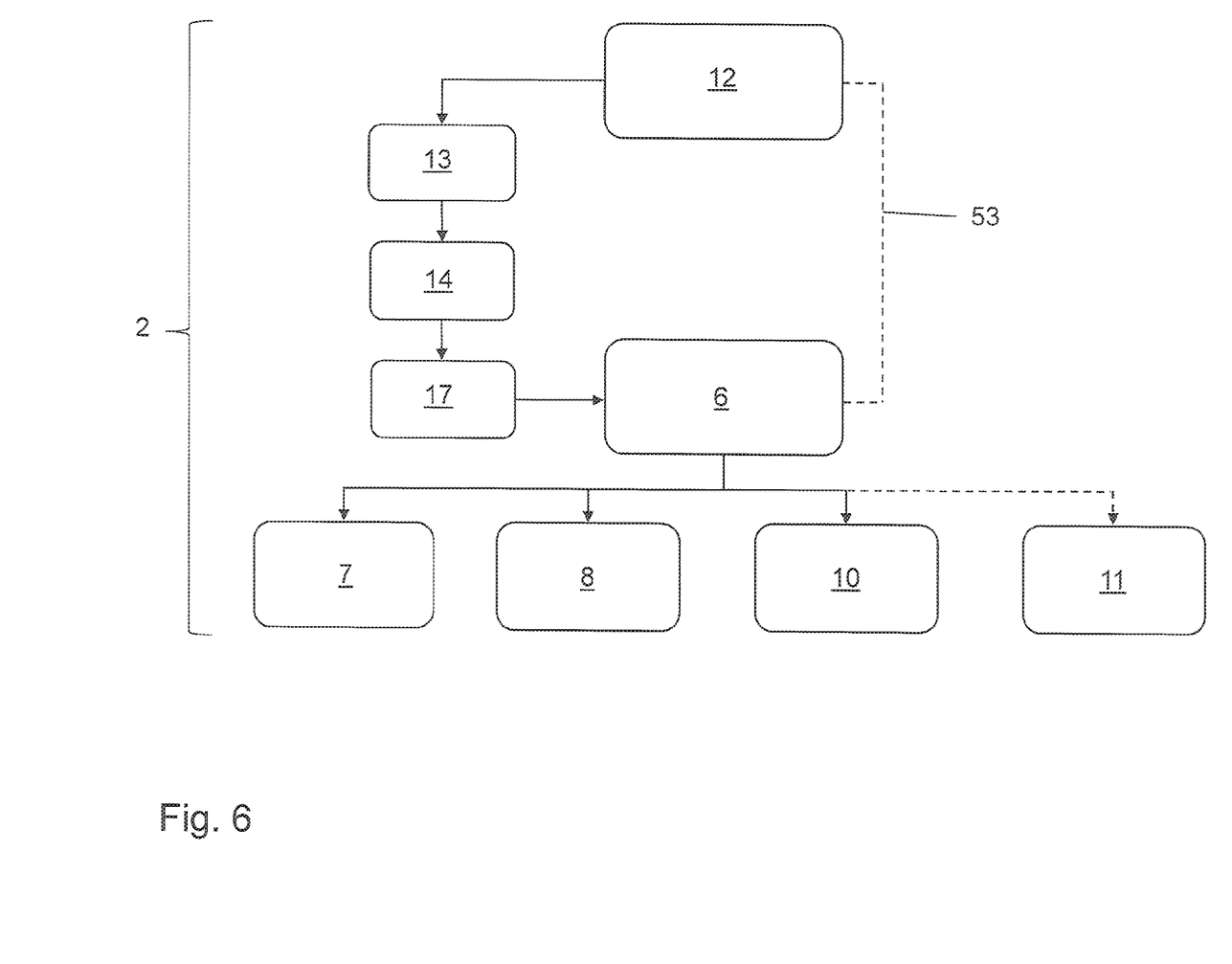
FIG. 6 is a schematic representation of the activation, analogous to FIG. 1, but with an additional data line installed between the database and the control unit.

In addition to the solution shown in FIG. 1, FIG. 6 shows an optional data line 53 arranged between the database 12 and the control unit 6. If a company-internal or a cross-company network is present, intermediate changes to the client data can advantageously be entered via such a permanent data line 53, and the operational sequence can accordingly be adapted immediately. For existing clients, changes of this type can involve, for example, additional standing orders or cancelations of such orders. Without a data line 53 of this type, such changes for the delivery of personalized printed products 1, 1' would only become effective at a later time, meaning after the database 12 is updated. In addition, the data present in the control device 6 can be read out via the data line 53 for a real-time reporting and made available to an evaluation software.

It will be understood that the above description of the present invention is susceptible to various modifications, changes and adaptations, and that the same are intended to be comprehended within the meaning and range of equivalents of the appended claims.

What is claimed is:

1. A method for producing personalized printed products for which at least one individually printed sheet is gathered together with a number of conventionally printed sheets to form the personalized printed products the method comprising steps of:

making available stacks of conventionally printed sheets;
  making available a roll which holds a pre-printed print material web including printed individual sheet segments, with each printed individual sheet segment having printed thereon a marking containing sequence information for controlling a selective gathering of the conventional printed products in production of the personalized printed products;
  reading out the markings on the individual sheet segments containing the sequence information for selectively gathering, from the stacks, the conventionally printed sheets that belong to respective personalized printed products to be formed;
  following the reading out of the markings on the individual sheet segments, cutting the print web material to form individually printed sheets corresponding to the individual sheet segments, respectively;
  selectively gathering the conventionally printed sheets in accordance with the sequence information read out from the marking on at least one individually printed sheet; and
  supplying at least one of the individually printed sheets to the selectively gathered, conventionally printed sheets associated with the sequence information of the marking read from the at least one individually printed sheet to form one of the personalized printed products.

2. The method according to claim 1, wherein the reading out step includes reading out the markings once the print material web is made available with the roll.

3. The method according to claim 1, wherein the gathering step includes supplying the at least one individually printed sheet to the selectively gathered, conventionally printed sheets, either upstream or downstream of at least one of the conventionally printed sheets.

4. The method according to claim 1, including:
transporting at least one of the individually printed sheets in a first clocked operation from a first position where the marking is read out to a second position where the at least one individually printed sheet is supplied to the selectively gathered, conventionally printed sheets;
transporting, in a second clocked operation, the conventionally printed sheets, starting from a third position in a first upstream separating out and feeding device for conventionally printed sheets, to the second position in which the individually printed sheets are supplied to the selectively gathered, conventionally printed sheets, wherein a first number of operational cycles of the first clocked operation during the transport of the at least one individually printed sheet is higher than a second number of operational cycles of the second clocked operation during the transport of the selectively gathered, conventionally printed sheets.

5. The method according to claim 1, the gathering step includes gathering and depositing successively following, individually printed sheets one above the other and jointly supplying the deposited and gathered individually printed sheets to the selectively gathered, conventionally printed sheets.

6. The method according to claim 1, wherein the gathering step includes opening the printed sheets belonging to a single personalized printed product to be formed, depositing the printed sheets belonging to the single personalized printed product to be formed successively one above the other in the opened state, then jointly transporting the opened and deposited sheets, and subsequently stitching together the opened and deposited printed sheets to form the single personalized printed product.

7. The method according to claim 6, further including folding the individually printed sheets in a longitudinal direction prior to the depositing step.

8. The method according to claim 1, further including forming a groove in at least one of the individually printed sheets in a longitudinal direction prior to or after the cutting of the at least one individually printed sheet from the print material web.

9. The method according to claim 1, further including depositing the printed sheets belonging to a single personalized printed product to be formed successively while positioned flat, one above the other, and subsequently jointly transporting and gluing together the deposited printed sheets to form the personalized printed product.

10. The method according to claim 1, further including additionally using the information read-out from the markings on the individual sheet segments for at least one of addressing and stacking the personalized printed products.

11. The method according to claim 1, further including printing the print material web with a digital printer.

12. An apparatus for producing personalized printed products which respectively comprise at least one individually printed sheet and a number of conventionally printed sheets, said apparatus comprising:
an unwinding device for a pre-printed print material web containing individual printed sheet segments along with a marking for controlling production of the personalized printed products, the marking containing sequence information for controlling a selective gathering of the conventional printed products in production of the personalized printed products;
a reading device arranged for reading the markings;
a cutting device arranged for cutting off individually printed sheets from the print material web with thereon printed individually printed segments;
a gathering device for the printed sheets;
a feeding device for transporting the individually printed sheets to the gathering device;
a plurality of separating out and feeding devices for separating out a plurality of conventionally printed sheets from a plurality of stacks of conventionally printed sheets according to the sequence information read out from the marking on one of the individually printed sheets and for supplying the plurality of the separated out, conventionally printed sheets to the gathering device, wherein the gathering device gathers at least one of the individually printed sheets together with the plurality of separated out, conventionally printed sheets associated with the sequence information of the marking read from the one individually printed sheet;
a binding device for binding the at least one individually printed sheet and the plurality of separated out, conventionally printed sheets gathered by the gathering device to form one of the personalized printed products; and
a control device to which at least the reading device, feeding device for the at least one individually printed sheet and the separating out and feeding devices for the conventionally printed sheets are connected.

13. The apparatus according to claim 12, wherein the reading device is arranged directly downstream of the unwinding device.

14. The apparatus according to claim 12, wherein the feeding device for the at least one individually printed sheet is arranged upstream or downstream of at least one of the separating out and feeding devices for conventionally printed sheets, to empty into the gathering device.

15. The apparatus according to claim 12, further including:
a clocked first transport section arranged between the reading device for the markings on the print material web and the feeding device for the at least one individually printed sheet; and
a clocked second transport section arranged between a first, upstream separating out and feeding device for conventionally printed sheets and the feeding device for the at least one individually printed sheet, wherein the first transport section has a first number of operating cycles which is higher than a second number of operating cycles for the second transport section.

16. The apparatus according to claim 12, further including a device adapted for gathering a plurality of individually printed sheets, which device is arranged upstream of the feeding device.

17. The apparatus according to claim 12, further including a saddle stitcher comprising the gathering device and the binding device, wherein the gathering device includes a gathering chain for depositing sheets successively, one on top of the other, for transporting previously opened printed sheets, and the binding device comprises a stitching machine arranged downstream of the gathering device.

18. The apparatus according to claim 12, further comprising a grooving device located upstream or downstream of the cutting device and operative for inserting grooves into at least one of the print material web and individually printed sheets cut from the web.

19. The apparatus according to claim 12, wherein the feeding device for the at least one individually printed sheet includes a folding device.

20. The apparatus according to claim 12, wherein the gathering device includes a conveying device on which the printed sheets are deposited successively and one above the other and which is used to transport the printed sheets while positioned flat, and that the binding device comprises an adhesive binder arranged downstream of the gathering device.

21. The apparatus according to claim 12, further comprising an addressing device for printing a mailing address onto the personalized printed products and a stack-forming station for preparing the personalized printed products for shipping, wherein at least one of the addressing device and the stack-forming station are connected to the control device.

22. The apparatus according to claim 12, wherein the web press comprises digital printing press.

* * * * *